United States Patent [19]

Bauer et al.

[11] Patent Number: 5,234,624
[45] Date of Patent: Aug. 10, 1993

[54] METHOD OF MANUFACTURE OF A DATA PROCESSING CARD PROVIDED WITH SIGNS AND DATA PROCESSING CARD PROVIDED WITH SIGNS OBTAINED BY LASER RADIATION

[76] Inventors: Eric Bauer, Rue Maujobia 113, 2006 Neuchatel, Canton of Neuchatel, Switzerland; Hermann Stockburger, Hebelweg 13, 7847 Badenweiler, Fed. Rep. of Germany

[21] Appl. No.: 747,598

[22] Filed: Aug. 19, 1991

[30] Foreign Application Priority Data

Aug. 22, 1990 [CH] Switzerland .............................. 730/90

[51] Int. Cl.$^5$ ........................ B29C 33/42; B29C 35/08; B29C 71/04
[52] U.S. Cl. ........................................... 264/21; 264/25
[58] Field of Search ...................... 264/25, 132, 119, 21

[56] References Cited

U.S. PATENT DOCUMENTS

| | | | |
|---|---|---|---|
| 3,594,261 | 7/1971 | Broerman | 264/25 |
| 3,627,858 | 12/1971 | Parts | 264/25 |
| 4,547,002 | 10/1985 | Colgate | 264/132 |
| 4,654,290 | 3/1987 | Spanjer | 264/132 |
| 4,657,714 | 4/1987 | Kenmochi et al. | 264/25 |
| 4,661,305 | 4/1987 | Carlomagno | 264/132 |
| 4,704,327 | 11/1987 | Schieber | 264/119 |
| 4,710,330 | 12/1987 | Lewandowski et al. | 264/132 |
| 4,711,690 | 12/1987 | Haghiri-Tehrani | 264/132 |

FOREIGN PATENT DOCUMENTS 62-243120 10/1987 Japan ...................................... 264/21

*Primary Examiner*—Jan H. Silbaugh
*Assistant Examiner*—Brian J. Eastley
*Attorney, Agent, or Firm*—Silverman, Cass & Singer, Ltd.

[57] ABSTRACT

Method of producing a data processing care by thermo-moulding a mixture of pulverulent polycarbonate with lamp-black at a proportion of 8 ppm of lamp-black with respect to the basic thermo-hardenable material. The inner face of the wall of the mould which gives rise to the front face of the card has a checkered pattern, the distance between the recesses, respectively the protrusions, of the checkered pattern being a multiple of the wave length of the laser ray used for applying on the card the contrasted signs. A laser tube piloted by a piloting unit including a program containing the indications which are to appear on the card, is used for directing a laser radiation onto the card. The infrared rays are absorbed by the lamp-black contained in the mass of the material of the card which is heated, thereby producing a change of color resulting in appearance of signs such as a signature and a photograph on the front face of the card.

10 Claims, 1 Drawing Sheet

METHOD OF MANUFACTURE OF A DATA PROCESSING CARD PROVIDED WITH SIGNS AND DATA PROCESSING CARD PROVIDED WITH SIGNS OBTAINED BY LASER RADIATION

BACKGROUND OF THE INVENTION a) Field of the Invention

The present invention relates to a method of manufacture of a data processing card provided with signs, as well as to a data processing card provided with signs obtained by carrying out said method.

b) Description of the Prior Art

Data processing cards provided with signs, especially intended to "personalize" them, that is to say to confer thereto characters unique to their owner, are known per se.

Such cards are, up to now, of the type called "multilayers" or of the "sandwich" type, that is to say, they are constituted by sheets of PVC (polyvinylchloride) with an uneven number of layers so that there is a neutral median layer which is not deformed when the card is bent. The first layer, on the front side of the card is transparent, and the second layer comprises a locking layer capable of absorbing infrared rays directed thereon.

The application of signs on such cards is effected by means of a laser ray, the radiation of which is retained by the second or absorbing layer which produces a carbonization of said layer owing to which the coloration thereof changes.

The disadvantages of such cards lies mainly in the material which is used, which is not very flexible, is non biodegradable, the destruction of which produces dioxine and, moreover, is expensive.

SUMMARY OF THE INVENTION

The object is achieved in accordance with the invention by using a pulverulent thermoplastic material mixed with a pulverulent material capable of absorbing infrared rays. A card is produced from said mixed material by heat moulding thereof. The card is then submitted to the action of a piloted laser ray which heats the infrared ray absorbing material such that the areas which are so heated are affected by modifications of color the result of which causes the said signal to appear. The front face of the wall of the mould on which is moulded the face of the card where the signs are to appear includes a relief, the distance between the recesses and the protrusions, respectively being a multiple of the wave length of the laser ray which is used.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilizing the same or equivalent principles may be used and structural changes may be made as desired by those skilled in the art without departing from the present invention and the purview of the appended claims.

DESCRIPTION OF THE PREFERRED EMBODIMENTS

Figure 1:
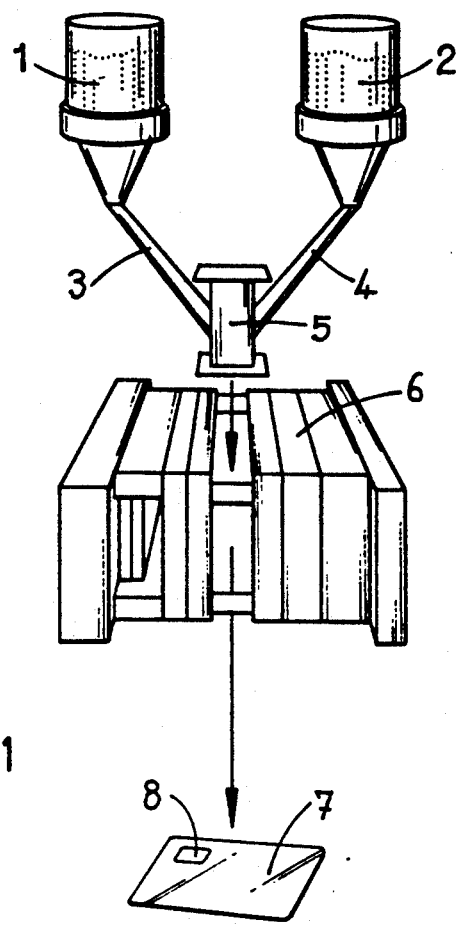
FIG. 1 is a diagrammatic perspective view of an installation for producing blank cards, that is to say, a cards without personalization signs.

The installation comprises a first vessel, designated by reference 1, in which one places a pulverulent granulated thermoplastic material, which is able to be moulded, for example a polycarbonate, and a second vessel, designated by reference 2, in which one places a pulverulent material able to absorb infrared rays, for instance carbon (lamp-black). The quantity of carbon powder with respect to the polycarbonate will vary from 4 to 24 ppm (part per million) and will preferably be of 8 ppm.

These two vessels 1, 2 are connected by pipes 3 and 4, respectively, to a mixing device 5 where a thorough mixing of the two components is effected.

From this point, the material which is thus mixed is conducted into a mould 6 where it is heat moulded into data processing cards, one of which is represented at 7. Such a card can comprise a microprocessor such as indicated at 8, for instance, which will be incorporated thereto during the process.

Figure 2:
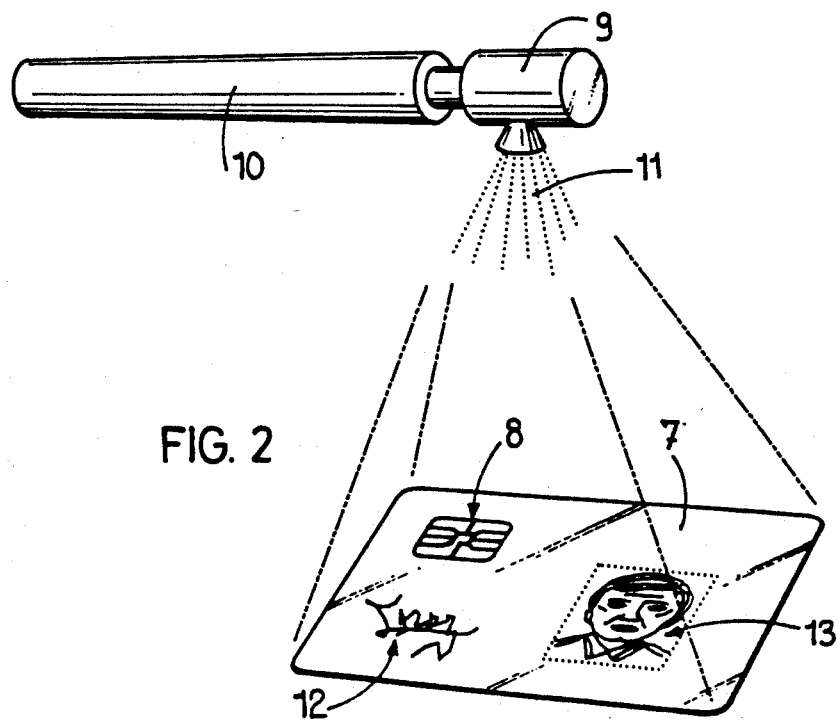
FIG. 2 is a diagrammatic perspective view of the installation for application of signs on the cards obtained by means of the installation of FIG. 1.

The application of the personalization signs of the card 7 are effected by means of a laser tube such as the tube 9 represented in FIG. 2, the ray of which is "piloted". The control program of the laser tube is introduced into the piloting unit as diagrammatically represented at 10. The program is constituted by a small disc or by a magnetic strip or by any other support, the indications being of the digital type.

The elaboration of such a program, which is not disclosed here in detail, because it is beyond the scope of the present invention, will be effected by means known per se. Thus, the image of the face of the future owner of the card and also the owner's signature can be recorded by means of a camera, the analogic information furnished by such cameras being then "digitized" to be used by the piloting unit 10 of the laser.

The laser radiation, diagrammatically indicated at 11 in FIG. 2, is directed onto the card 7. The fact that the infrared rays of the laser radiation are absorbed by the carbon (lamp-black) produces heat which creates a modification of the color of the mass. Signs, in the present case the signature of the owner indicated at 12 and his photograph indicated at 13, appear then on the card.

Experience has shown that, in order for the results to be satisfactory, that is to say that the signs are well contrasted, the state of the surface of the front face of the card on which the signs are to be visible, must be a function of the wave length of the laser ray which is used.

Thus, this state of the surface, or rugosity, will be preferably a checkered pattern which will be applied previously to the inner face of the mold intended to produce the front face of the card. The distance between the protrusions or between the recesses of the checkered pattern, which are formed of parallel lines or of a net of parallel lines crossing each other, must vary from two to three times the wave length of the laser which is preferably a laser YAG of a wave length of 1064 nanometers. If said ratio of the distance between the elements of the relief of the front face of the card and the wave length of the laser is followed, the quality of the signs applied on the card by the laser is optimal.

It is to be noted that it is not necessary that the whole front face of the card include the desired rugosity portions only of areas of the front face of the card may be so prepared.

It is also to be noted that, so as to render the card more clear, since the presence of the lamp-black has a tendency to darken the card, a pulverulent fluorescent pigment, in the same quantity as the lamp-black can be added into the vessel 1 prior to the mixing step with the lampblack.

A layer of transparent protective lacquers also may be applied to the front face of the card before the personalization signs are applied thereto.

We claim:

1. Method of producing a data processing card provided with signs on a front face thereof, said method comprising the steps of, mixing a pulverulent thermoplastic material with a pulverulent material capable of absorbing infrared rays, heat molding said mixed material in a mold having a face for producing the front face of the card, said face of the mold having a protruding relief pattern with recesses between protrusions thereof, the resultantly formed front face of the card having molded recesses and protrusions, submitting areas of the front face of the heat molded card to a piloted laser ray to heat the material capable of absorbing the infrared rays produced by the laser ray such that heated areas of the front face change color resulting in said signs, the distances between the tops of the protrusions and the bottoms of the recesses on the front face of the card being a multiple of the wave length of the laser ray to which the front face is submitted.

2. Method as claimed in claim 1 in which the infrared ray absorbing material is lamp-black.

3. Method as claimed in claim 2 in which the quantity of lamp-black with respect to the thermoplastic material varies from 4 to 24 ppm.

4. Method and claimed in claim 1 in which fluorescent pulverulent material is added to the mixed material prior to the step of heat molding.

5. Method as claimed in claim 4 in which the quantity of fluorescent material with respect to the thermoplastic material varies from 4 to 24 ppm.

6. Method as claimed in claim 1 in which the distances between the tops of protrusions and the bottoms of the recesses on the front face of the card are two times the wave length of the laser ray.

7. Method as claimed in claim 6 in which the laser ray has a wave length of the order of 1000 nanometers.

8. Method as claimed in claim 1 in which the distances between the tops of the protrusions and the bottoms of the recesses on the front face of the card are three times the wave length of the laser ray.

9. Method as claimed in claim 8 in which the laser ray has a wave length of the order of 1000 nanometers.

10. Method as claimed in claim 1 in which said face of the mold is formed with a checkered pattern.

* * * * *